(12) United States Patent
Gilbert et al.

(10) Patent No.: US 6,820,734 B1
(45) Date of Patent: Nov. 23, 2004

(54) CONVEYOR BELT CLEANER TENSIONING DEVICE

(75) Inventors: Robert Patrick Gilbert, Pheasant Nest (AU); Kevin Rudd, Paterson (AU)

(73) Assignee: Mato Australia Pty Ltd., Narellan (AU)

( * ) Notice: Subject to any disclaimer, the term of this patent is extended or adjusted under 35 U.S.C. 154(b) by 100 days.

(21) Appl. No.: 10/089,283

(22) PCT Filed: Sep. 27, 2000

(86) PCT No.: PCT/AU00/01175

§ 371 (c)(1),
(2), (4) Date: Jan. 7, 2003

(87) PCT Pub. No.: WO01/23284

PCT Pub. Date: Apr. 5, 2001

(30) Foreign Application Priority Data

Sep. 27, 1999 (AU) .............................................. PQ3116
May 9, 2000 (AU) .............................................. PQ7388

(51) Int. Cl.[7] .............................................. B65G 45/16
(52) U.S. Cl. ...................................................... 198/499
(58) Field of Search ........................................ 198/499

(56) References Cited

U.S. PATENT DOCUMENTS

| | | | | |
|---|---|---|---|---|
| 4,402,394 A | | 9/1983 | Stoll ........................... | 198/499 |
| 4,664,250 A | | 5/1987 | Jakobs ....................... | 198/499 |
| 4,836,356 A | * | 6/1989 | Mukai et al. ................ | 198/499 |
| 4,969,553 A | | 11/1990 | Stoll ........................... | 198/499 |
| 5,065,859 A | | 11/1991 | Brumby ....................... | 198/499 |
| 5,248,026 A | * | 9/1993 | Morefield .................... | 198/499 |
| 6,152,290 A | * | 11/2000 | Mott et al. ................... | 198/499 |

FOREIGN PATENT DOCUMENTS

| | | | | |
|---|---|---|---|---|
| GB | 1420439 | | 1/1976 | |
| GB | 2227991 A | * | 8/1990 | ........... B65G/45/00 |

* cited by examiner

Primary Examiner—Christopher P. Ellis
Assistant Examiner—Mark A. Deuble
(74) Attorney, Agent, or Firm—Jane E. Remillard, Esq.; Lahive & Cockfield, LLP (57) ABSTRACT

The present invention relates to a conveyor belt cleaning apparatus for use with belt conveyors. The invention provides a conveyor belt cleaning apparatus (1) for use with a belt conveyor, the cleaning apparatus comprising a first arm (20*a*) and a second arm (20*b*) adapted to support a scraping blade (30), the first and second arms being rotatably mounted on a shaft (2) for independent rotation about an axis, the rotation of the arms causing corresponding positional adjustments of the scraping blade (30) with respect to the belt. The mountings (21*a*, 21*b*) of each arm (20*a*, 20*b*) on the shaft (2) includes a biasing means which, in use, acts to bias the arms towards the conveyor belt. The apparatus further includes an intermediate arm (40) located midway between the first arm (20*a*) and the second arm (20*b*) one end of which is connected to the shaft (2) and the opposing end of which is connected to the scraping blade (30) to provide support for the scraping blade (30).

13 Claims, 8 Drawing Sheets

CONVEYOR BELT CLEANER TENSIONING DEVICE

FIELD OF THE INVENTION

The present invention relates generally to belt conveyors, and more particularly to a conveyor belt cleaning apparatus for use with such conveyors.

BACKGROUND TO THE INVENTION

Belt conveyors are used in a variety of applications for the transportation of particulate or granular material, such as coal, grain, ore, minerals, and the like.

One problem commonly encountered with belt conveyors is the tendency for particulate material to adhere to the carrying surface of the conveyor belt. This problem is particularly significant in applications such as underground mining operations and coal transportation, where the material moving on the belt must continually be sprayed with water to suppress dust. The water mixes with the fine particulate component of the coal or other material to form a slurry which is particularly prone to sticking to the surface of the belt. This phenomenon reduces the transportation efficiency, and increases the running and maintenance costs of the conveyor.

In an attempt to ameliorate these problems, various conveyor belt cleaners in the form of scraping devices have been developed to scrape residual debris from the surface of the belt. These are normally positioned on the underside of the conveyor, at or near the head pulley and just past the intended discharge point, such that the lower run of the belt on its return loop is substantially clean.

However, known scraping devices have several inherent disadvantages. The most significant of these relates to the need for the scrapers to accommodate surface irregularities in the belt. Such irregularities most commonly take the form of belt fasteners. which are typically formed from steel and protrude beyond the surface of the belt. These fasteners can cause hardened scraping blades to break, chip or shatter, leading to reduced scraping efficiency and downtime whilst repair operations take place. This can also cause premature failure of the belt fasteners.

In an attempt to avoid these problems, some scraping blades have been formed from relatively soft materials such as polyurethane, polypropylene and other plastics. Whilst being better able to accommodate surface irregularities in the belt without breakage, such blades are prone to rapid abrasive wear, and hence require frequent replacement. This is costly, and again often results in undesirable downtime.

A further problem with known scraping devices relates to the need for each of several-scraping blades to be individually adjusted to the correct position relative to the belt, and relative to the adjacent blades. This set-up procedure is time consuming, labour intensive and expensive. Moreover, frequent recalibration is normally required in order to accommodate wear of the scraping blades.

It is an object of the present invention to provide a belt scraping assembly which overcomes or substantially ameliorates at least some of these disadvantages of the prior art.

SUMMARY OF THE INVENTION

Accordingly, a first aspect of the present invention provides a conveyor belt cleaning apparatus for a belt conveyor, the cleaning apparatus comprising:

a shaft, a pair of mounting assemblies for mounting the shaft to a frame of the belt conveyor, the shaft being rotatably mounted within the mounting assemblies, a first arm and a second arm for supporting a scraping blade, the first and second arms independently mounted on the shaft and independently rotatable about the axis of the shaft, the mountings of the first and second arms adapted to bias the respective arms towards the conveyor belt surface, the apparatus further including a third arm mounted on the shaft and located intermediate the first and second arms for supporting the scraping blade, such that rotation of the arms about the axis of the shaft results in positional adjustments of the scraping blade with respect to the conveyor belt surface, the arms being pivotably connected to the scraping blade to provide relatively uniform contact pressure between the blade and the conveyor belt surface across the width of the blade.

In use the scraping blade is maintained in a plane substantially perpendicular to the plane of the conveyor belt surface.

Preferably, when mounted to the frame of the belt conveyor the axis of the shaft is substantially transverse to the direction of movement of the conveyor belt.

Preferably, the mountings of the first and second arms each include a resilient element configured to urge the scraping blade into operative scraping engagement with the conveyor belt surface. In one preferred embodiment the resilient element comprises a torsion spring. In another preferred embodiment the resilient element is formed from a resiliently deformable material.

Preferably, the mountings are adjustable so as to produce the desired contact pressure between the scraping blade and the conveyor belt surface.

In one preferred embodiment, the mountings of the first and second arms each include a pair of collars comprising a first collar which is rotatably mounted on the shaft and to which a respective arm is connected and a second collar adapted to be locked in position on the shaft, a torsion spring being interposed between the first and second collars with free ends of the torsion spring engaging with the first and second collars, wherein by rotatably adjusting the relative position of the first and second collars on the shaft it is possible to adjust the spring tension in the torsion spring and the biasing torque imposed on the arms connected to each end of the scraping blade.

Preferably, each mounting assembly further includes a locking collar through which the shaft passes and which is locked in position on the shaft, a mounting block, and a torsion spring interposed between the locking collar and the mounting block, with one free end of the torsion spring being engaged in the locking collar and a second free end being engaged in the mounting block so as to provide a torque on the shaft.

Preferably, the third arm comprises a first link and a second link which are pivotably connected together at a hinge point, the first link being connected to the shaft and the second link being connected to the scraping blade. Preferably, the second link is adjustable in length by means of a threaded shaft and nut arrangement.

Preferably, the conveyor belt cleaning apparatus according to the present invention is adapted to be positioned on the underside of the conveyor belt so as to clean the carrying surface of the conveyor belt as it returns from its discharge point.

Advantageously, the present invention provides a conveyor belt cleaning apparatus for positioning a scraping blade against the surface of a conveyor belt and which is designed to maintain a relatively uniform blade pressure across substantially the full width of the blade, whilst maintaining the blade in a plane substantially perpendicular to the plane of the conveyor belt surface.

The present invention has particular application with a curved scraping blade, although the invention may be adapted for use with a straight (also known as "inline") scraping blade. Currently, belt cleaners which employ a curved blade use an adjustment mechanism which produces an arced motion so as to bring the cleaner blade into contact with the conveyor belt. This results in a non-uniform pressure across the width of the blade, with greater pressure being applied around the mid point of the cleaner blade.

Unless the context clearly requires otherwise, throughout the description and the claims, the words 'comprise', 'comprising', and the like are to be construed in an inclusive as opposed to an exclusive or exhaustive sense; that is to say, in the sense of "including, but not limited to".

BRIEF DESCRIPTION OF THE DRAWINGS

Preferred embodiments of the invention will now be described, by way of example only, with reference to the accompanying drawings in which.

DESCRIPTION OF THE PREFERRED EMBODIMENT

Referring to the accompanying drawings, the present invention provides a conveyor belt cleaning apparatus 1 for use with a conveyor comprising an endless flexible belt extending between head pulleys (not shown). The head pulleys, intermediate rollers, drive mechanisms and associated support structures of conventional belt conveyor assemblies are well known to those skilled in the art, and so will not be described in further detail.

Figure 1:
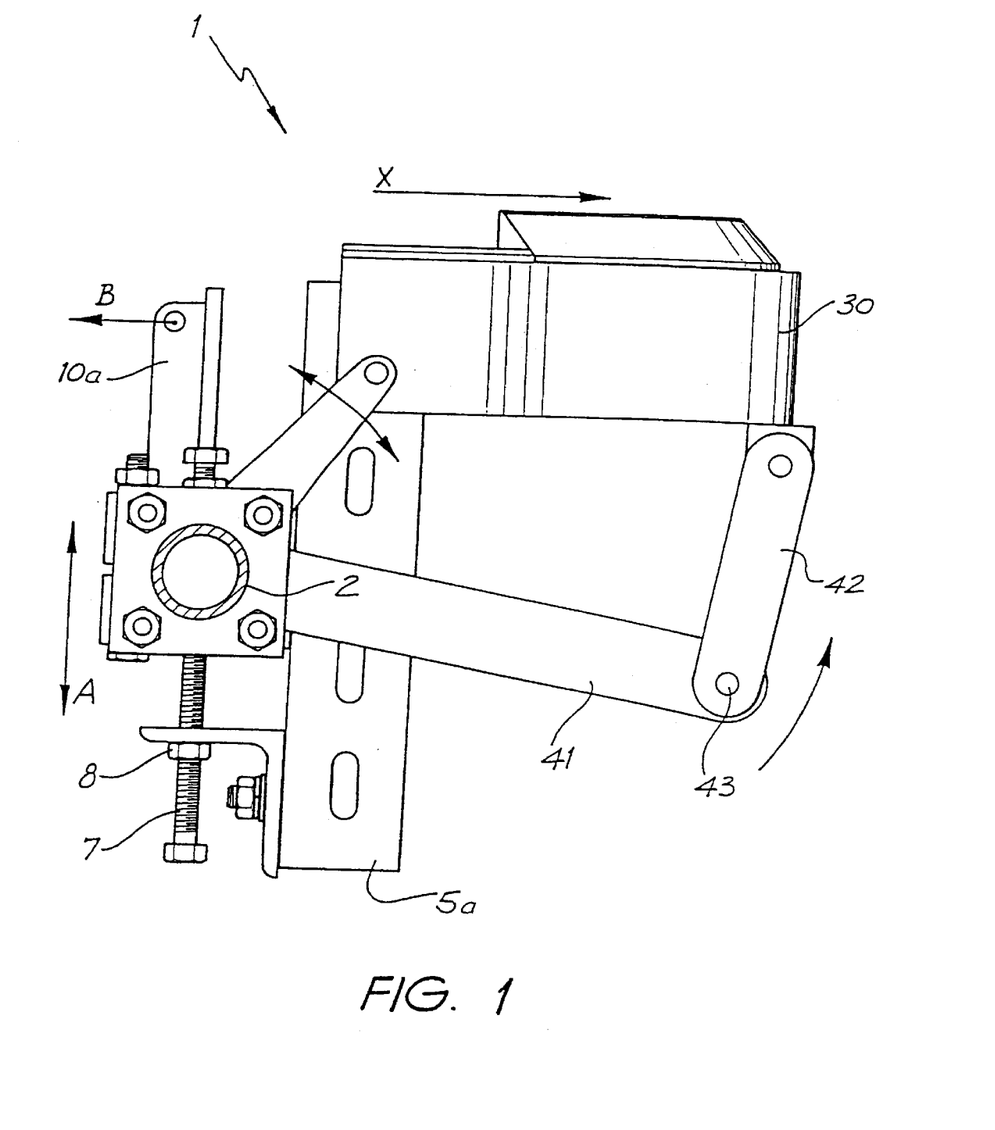
FIG. 1 is a side elevation of one preferred embodiment of a belt cleaner assembly according to the present invention, adapted for mounting to a belt conveyor.
Figure 2:
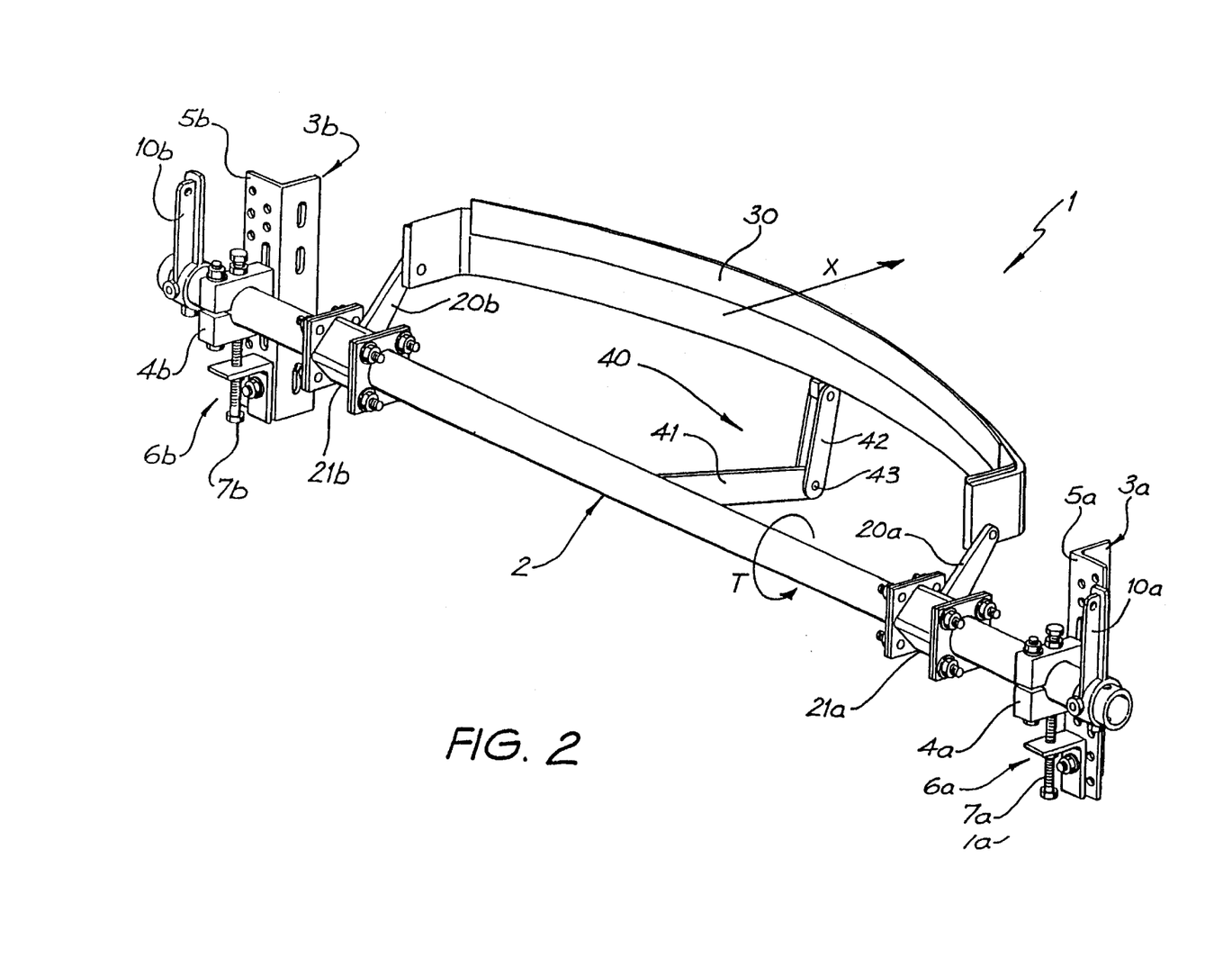
FIG. 2 is a perspective view of the belt cleaner assembly shown in FIG. 1.
Figures 3, 4:
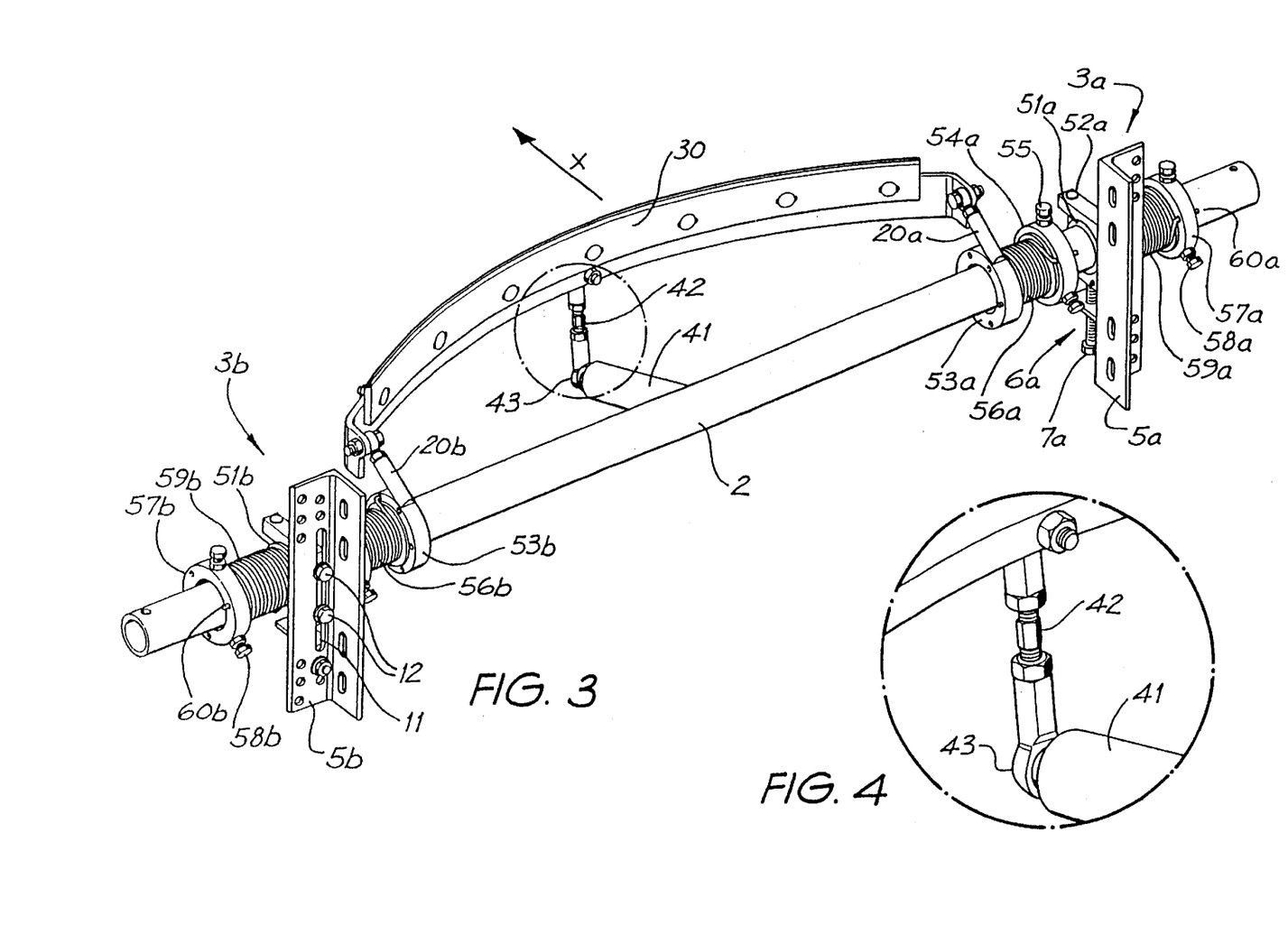
FIG. 3 is a perspective view of a second preferred embodiment of a belt cleaner assembly according to the present invention.
FIG. 4 is an enlarged perspective view of the scraping blade support arm circled in broken line in FIG. 3.
Figure 5:
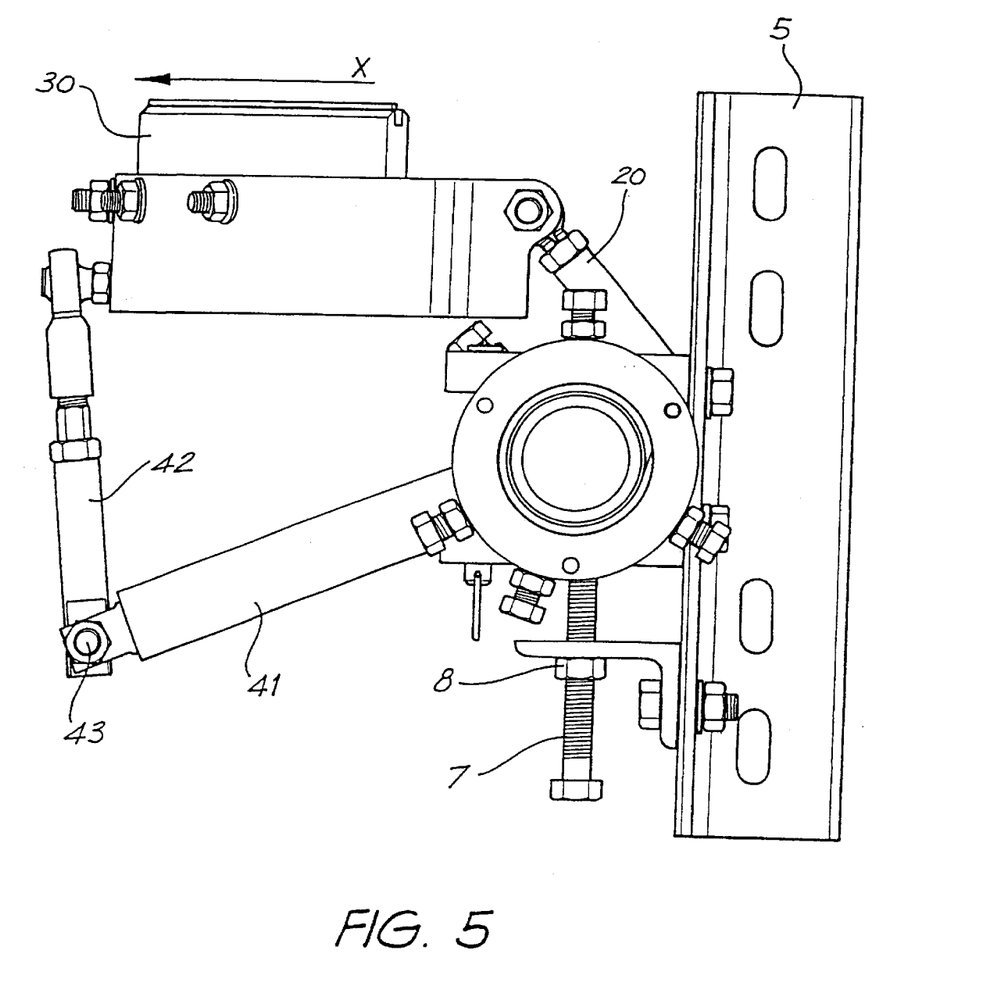
FIG. 5 is a side elevation of the belt cleaner assembly shown in FIG. 3.
Figure 6:
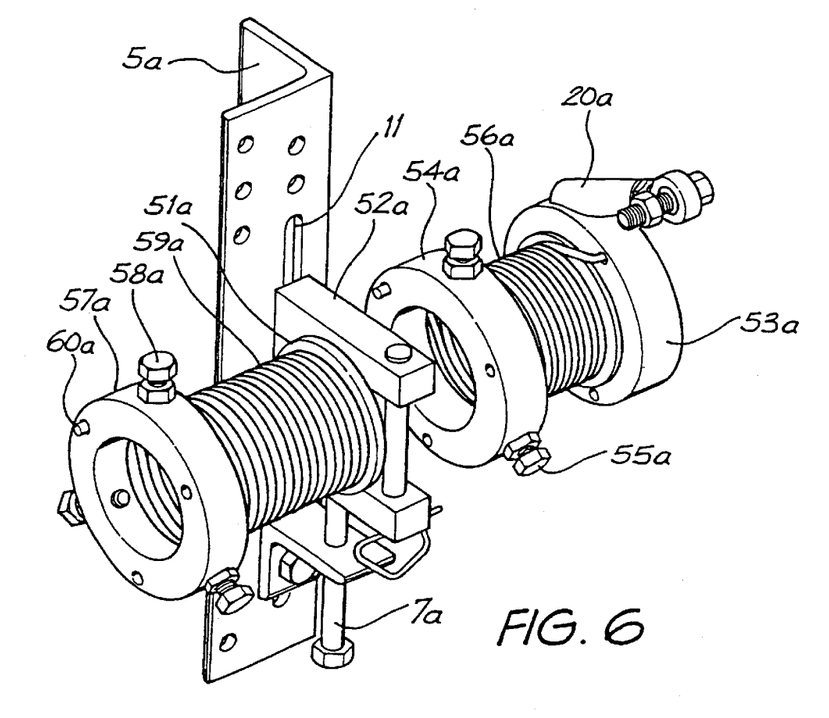
FIG. 6 is a partially exploded perspective view of the scraping blade mounting and tensioning sub-assembly.
Figure 7:
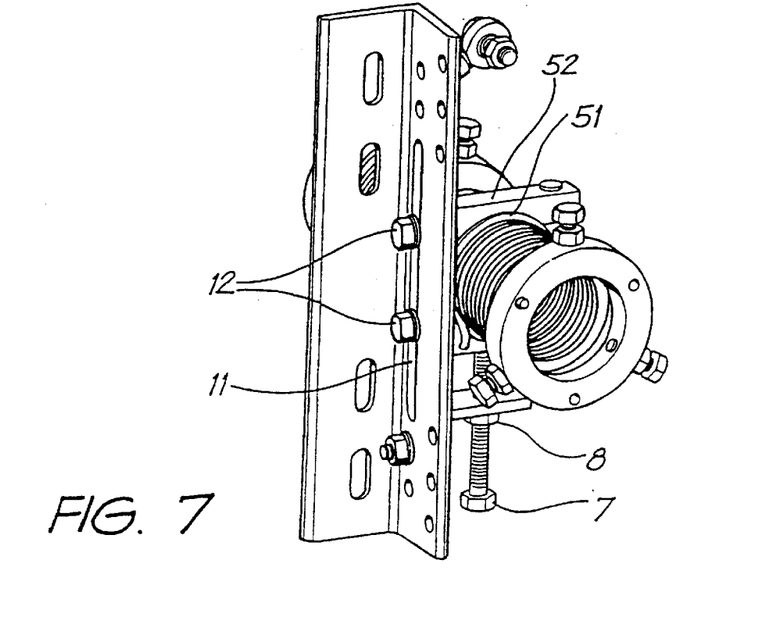
FIG. 7 is a further perspective view of the mounting and tensioning sub-assembly shown in FIG. 6.

Referring to FIGS. 1 and 2, a first preferred embodiment of a conveyor belt cleaning apparatus according to the present invention is depicted. The conveyor belt cleaner 1 includes a shaft 2 which, in use, is mounted on the conveyor structure so as to extend transversely across the width of the conveyor. At each end of the shaft 2 there is provided a mounting sub-assembly 3a, 3b in order to mount the belt cleaner to the frame of the conveyor (not shown). In use, the belt cleaner assembly is mounted on the underside (commonly referred to as the "return side") of the conveyor belt so as to clean the carrying surface of the conveyor belt as it returns from its discharge point. The direction of motion of the conveyor belt is indicated by the arrow X.

The mounting sub-assemblies 3a, 3b include bearings 4a, 4b within which respective ends of the shaft 2 are rotatably mounted. The bearings 4a, 4b are each mounted on mounting plates 5a, 5b of the respective mounting sub-assemblies 3a, 3b. Each mounting sub-assembly 3a, 3b further includes a respective adjustment means 6a, 6b at each end of the shaft 2 in the form of a threaded bolt and nut arrangement 7, 8 so as to provide for adjustment of the position of the shaft 2 relative to the plane of the conveyor belt. In use the adjustment means 6a, 6b provides for the movement of each end of the shaft 2 in a substantially vertical plane as illustrated by arrow A in FIG. 1.

Fixedly mounted on each end of the shaft 2 are arms 10a, 10b. In use, each arm 10a, 10b is connected to a tensioning means (not shown) in the form of a spring, pneumatic or hydraulic ram, or the like which applies a tension force to the arm in the direction indicated by the arrow B in FIG. 1. This force is transmitted via the arms 10a, 10b to provide a torque (indicated by the arrow T in FIG. 2) to the shaft 2 and bring scraping blade 30 into contact with the carrying surface of the conveyor belt. In this way a pre-load force is applied to the scraping blade 30 which allows the blade to follow the surface of the belt as it moves during operation.

The belt cleaner assembly further includes a pair of arms 20a, 20b, which are mounted on the main shaft 2. The arms 20a, 20b are pivotably connected to respective ends of a curved cleaner blade 30 so as to support the cleaner blade at its ends and provide a relatively uniform and controlled contact pressure between the blade and the conveyor belt surface across the full width of the blade. The mountings 21a, 21b of the arms 20a, 20b on the shaft 2 are adapted to provide for independent tensioning so as to allow each arm to move independent of the other and thereby allow for any belt movement. Each mounting 21a, 21b on the shaft includes a resilient biasing means (not shown) which permits a degree of biased rotation for each arm with respect to the axis of the shaft 2 and which, in use, acts to bias the respective arms 20a, 20b towards the conveyor belt. In the embodiment depicted in FIGS. 1 and 2 the mountings 21a, 21b preferably include a resiliently deformable material, such as rubber, which acts to resiliently bias the respective arms 20a, 20b towards the conveyor belt. However it should be appreciated that other forms of biasing may be employed, such as springs for example.

The assembly further includes a supporting arm arrangement 40 located intermediate the end arms 20a, 20b. Preferably the intermediate arm 40 is located mid-way between the end arms 20a, 20b. The intermediate arm arrangement 40 assists in keeping a uniform pressure on the blade over the full width of the blade. The linkage comprises an arm 41 which is connected at one end to the shaft 2 and is pivotably connected to arm 42 at hinge point 43. The supporting arm 40 acts to maintain the cleaner blade substantially perpendicular to the surface of the conveyor belt.

Referring to FIGS. 3 to 10 a second preferred embodiment of the present invention is depicted. For the sake of clarity, those components which are shared with the embodiment depicted in FIGS. 1 and 2 are provided with identical reference numerals.

In this embodiment the mounting sub-assembly 3a, 3b for each end of the shaft 2 includes a mounting bush 51a, 51b within which the shaft 2 is rotatably mounted. Each mounting bush 51a, 51b is held in a respective mounting block 52a, 52b which is attached to mounting plate 5a, 5b. The mounting plates 5a, 5b are each provided with an elongated slot 11 through which bolts 12 pass so as to secure the mounting block to the mounting plate. Each mounting sub-assembly includes a respective adjustment means 6a, 6b at each end of the shaft 2 in the form of a threaded bolt 7 and nut 8 arrangement so as to provide for adjustment of the position of the shaft 2 relative to the plane of the conveyor belt as previously described with reference to the embodiment of FIGS. 1 and 2. When the end of the shaft is located in the correct position the bolts 12 are tightened to secure the mounting block in position on the mounting plate.

Each mounting sub-assembly further includes a pair of inner and outer torsion springs and collars which are mounted on the shaft 2 and which are configured to impart the desired loadings upon the cleaner blade 30. As with the embodiment of FIGS. 1 and 2, each end of the cleaner blade is pivotably connected to an arm 20a, 20b. The arms 20a, 20b are connected to a pair of first collars 53a, 53b which are rotatably mounted on respective ends of the shaft 2. A pair of second collars 54a, 54b are rotatably mounted on respective ends the shaft but can be locked in position on the shaft 2 by means of locking screws/bolts 55. A pair of first torsion springs 56a, 56b are interposed between each pair of adjacent first and second collars with the free ends of the torsion spring engaging in the collars. By rotatably adjusting the relative position of the first and second collars on the shaft it is possible to adjust the spring tension in the torsion springs 56a, 56b and hence the biasing torque imposed on the arms 20a, 20b connected to each end of the cleaner blade.

Each mounting sub-assembly further includes an outer locking collar 57a, 57b through which the shaft 2 passes and which can be locked in position on the shaft by means of locking screws/bolts 58. A second torsion spring 59a, 59b is interposed between each outer locking collar 57a, 57b and its respective mounting block 52a, 52b, with one free end 60a, 60b of the torsion spring being engaged in the respective collar 57a, 57b and the second free end 61a, 61b being respectively engaged in the mounting block 52a, 52b.

As with the embodiment depicted in FIGS. 1 and 2, the assembly further includes a supporting arm arrangement 10 located intermediate the end arms 20a, 20b. Preferably the intermediate arm 40 is located midway between the end arms 20a, 20b. The linkage comprises an arm 41 which is connected at one end to the shaft 2 and is pivotally connected to arm 42 at hinge point 43. In the embodiment depicted in FIGS. 3 to 10, the arm 42 is adjustable in length by means of a threaded shaft and nut arrangement.

Figure 8:
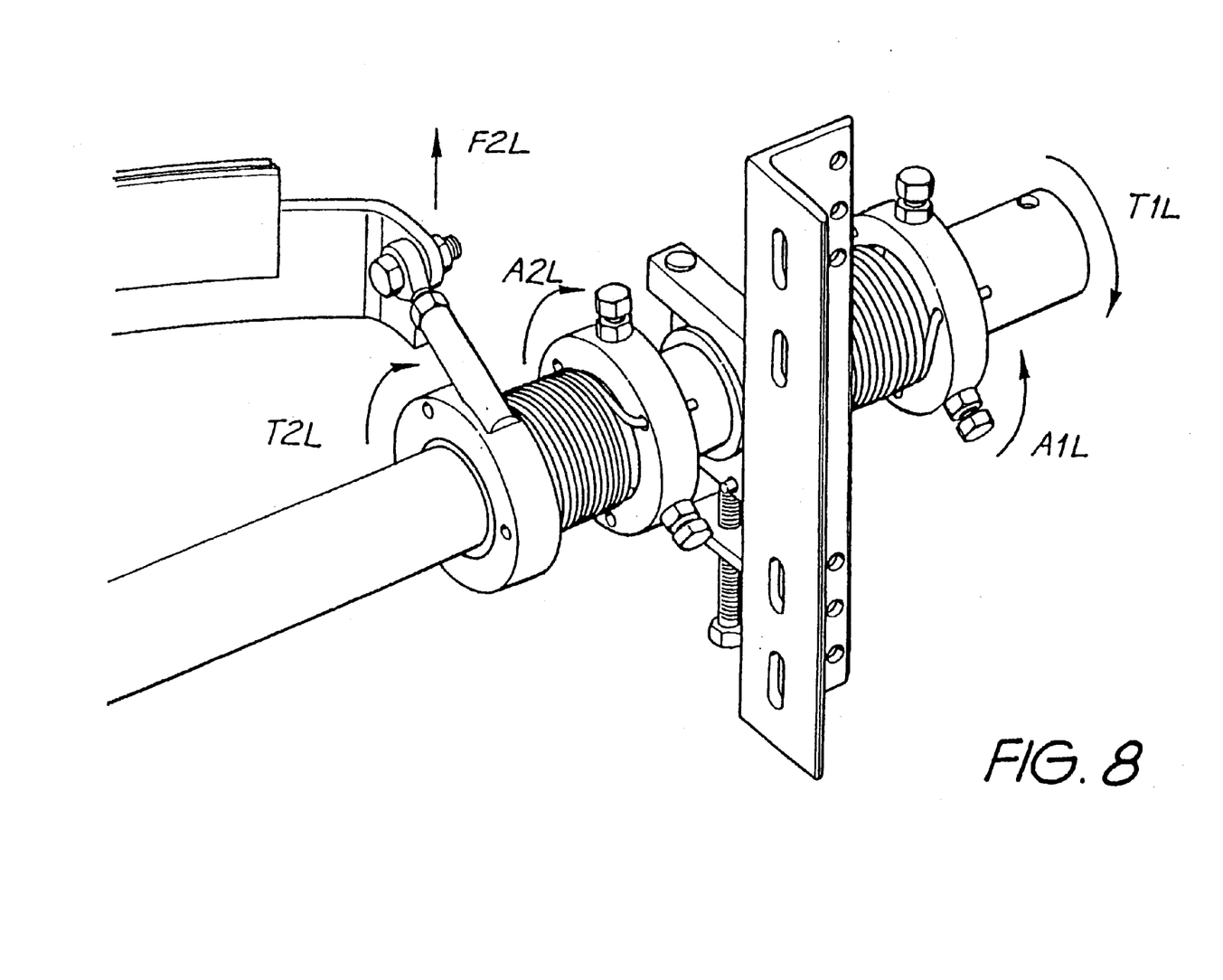
FIG. 8 is a perspective view of the belt cleaner assembly illustrating the torque and load vectors when the belt cleaner assembly is in use.
Figure 9:
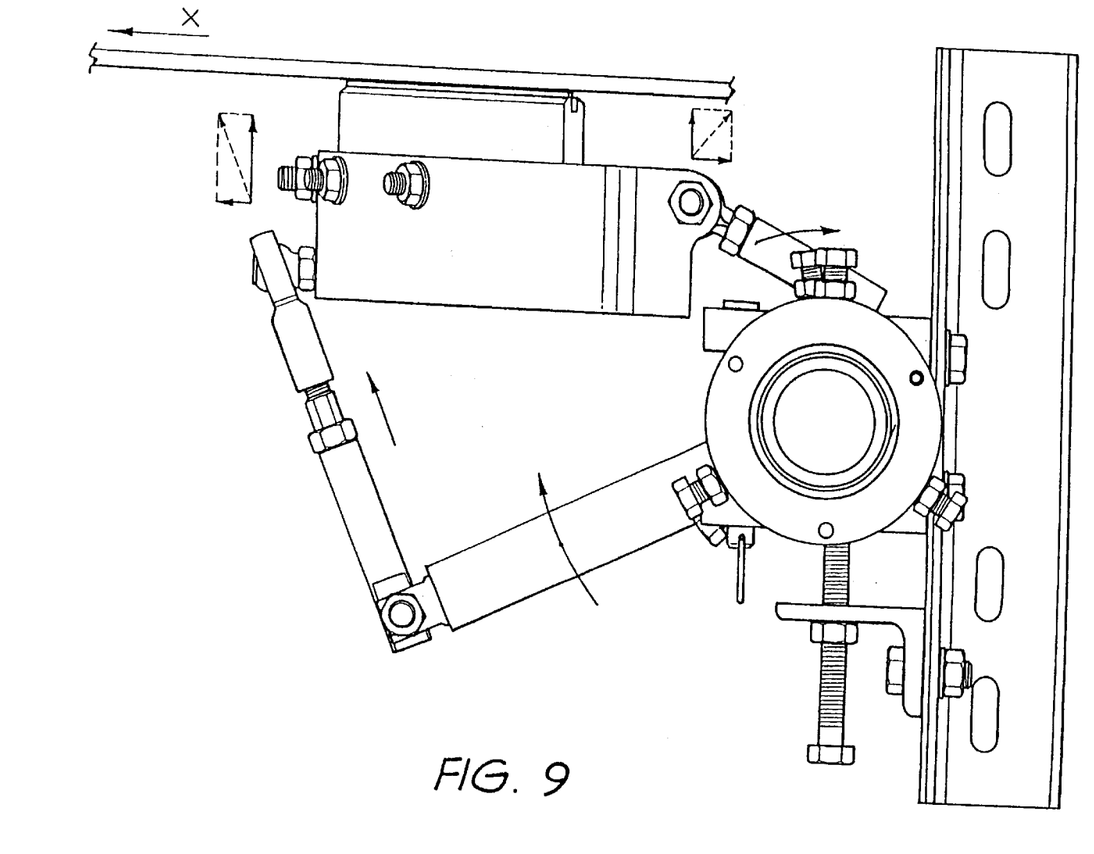
FIG. 9 is a side view of the belt cleaner assembly illustrating the torque and load vectors when the belt cleaner assembly is in use.
Figure 10:
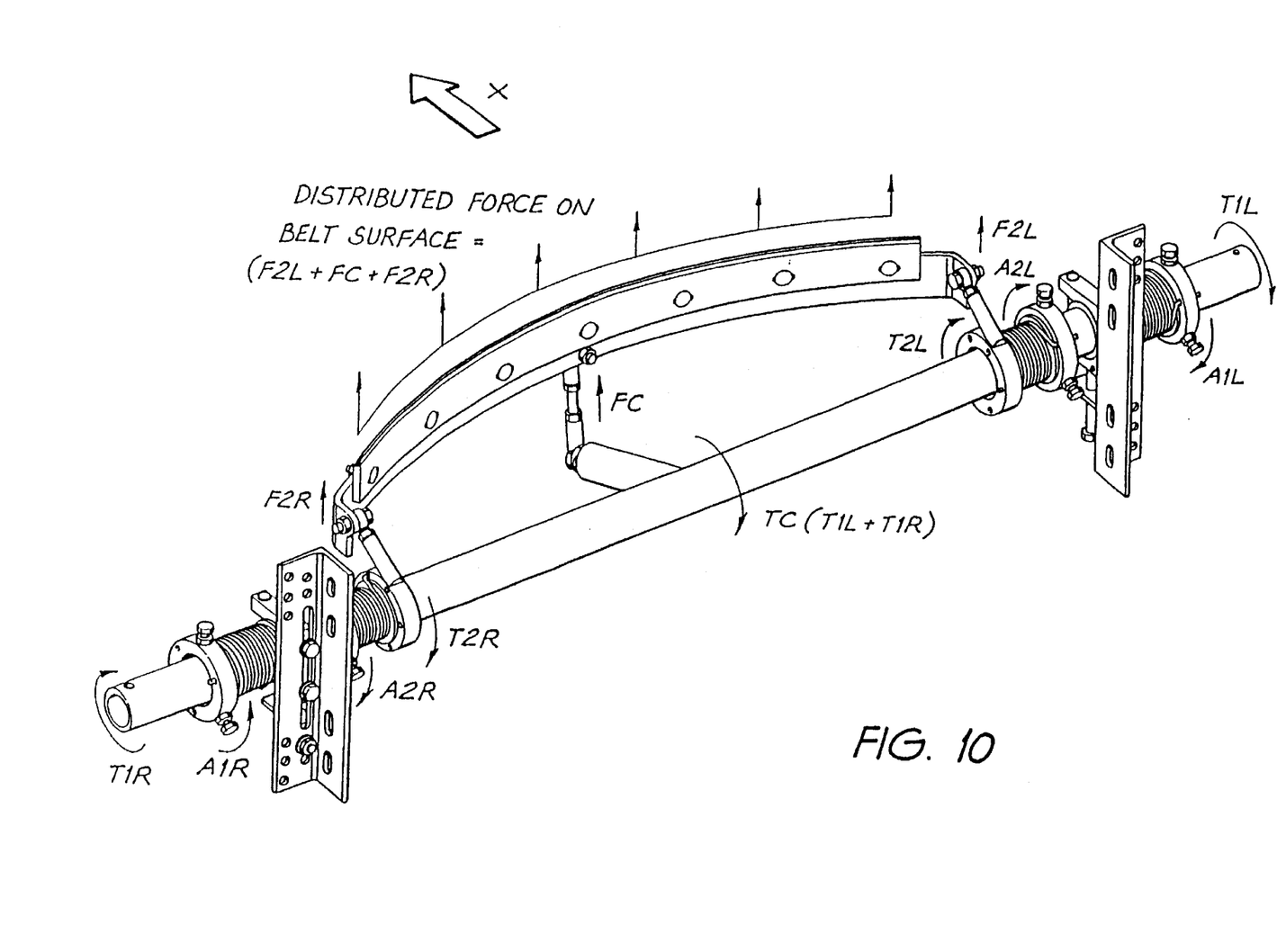
FIG. 10 is a perspective view of the belt cleaner assembly illustrating the torque and load vectors when the belt cleaner assembly is in use.

Referring to FIGS. 8 to 10, typical force and torque vectors imposed on the cleaner assembly when in use are illustrated. The shaft 2 is free to rotate in the mounting bushes 51a, 51b and is attached to the cleaner blade 30 by means of the outer arms 20a, 20b and the intermediate arm 40. The outer torsion spring 59a, 59b on each end of the shaft has one free end engaged in its adjacent mounting block 52a, 52b and its other free end engaged in its respective outer torsion collar 57a, 57b. The outer torsion springs are supplied in sets of two, with one being wound left hand and the other right hand. By means of the outer torsion springs, the outer torsion collar on each end of the shaft provides a torque to the shaft 2 which acts against the shaft's tendency to rotate away from the conveyor belt when under load. This provides an upward force "FC" acting at the cleaner's blade centre (see FIG. 10).

Adjustment of the magnitude of the force "FC" is achieved by holding the shaft stationary, loosening the locking bolts in the torsion collar, rotating the torsion collar in the direction of "A1L" and "A1R" respectively until the desired pre-load is achieved and then tightening the locking bolts to secure the torsion collar in the new position. The cleaner blade connecting arms 20a, 20b provide the forces "F2L" and "F2R" at each end of the cleaner blade via the inner torsion springs. The forces "F2L" and "F2R" are increased by adjusting the inner torsion collars position on the shaft in the direction indicated by "A2L" and "A2R". The forces "F2L" and "F2R" act independently of each other and thus provide the even distribution of cleaner blade pressure on the belt while allowing the blade to follow any variations in the plane of the conveyor belt.

Advantageously, the assembly of the present invention provides for a belt cleaner assembly which provides a relatively uniform pressure across the full width of the cleaner blade whilst enabling a full adjustable inline tensioning device.

Although the invention as been described with reference to specific examples, it will be appreciated by those skilled in the art that the invention may be embodied in many other forms.

What is claimed is:

1. A conveyor belt cleaning apparatus for a belt conveyor, said cleaning apparatus comprising:

a shaft, a pair of mounting assemblies for mounting the shaft to a frame of the belt conveyor, said shaft being rotatably mounted within said mounting assemblies, a first arm and a second arm for supporting a scraping blade, said first and second arms independently mounted on said shaft and independently rotatable about the axis of the shaft, the mountings of said first and second arms adapted to bias the respective arms towards the conveyorbelt surface, said apparatus further including a third arm mounted on said shaft and located intermediate said first and second arms for supporting said scraping blade, such that rotation of said arms about the axis of the shaft results in positional adjustments of the scraping blade with respect to the conveyor belt surface, said arms being pivotably connected to said scraping blade to provide relatively uniform contact pressure between the blade and the conveyor belt surface across the width of the blade.

2. A conveyor belt cleaning apparatus as defined in claim 1 wherein in use the scraping blade is maintained in a plane substantially perpendicular to the plane of the conveyor belt surface.

3. A conveyor belt cleaning apparatus as defined in claim 1 wherein when mounted to the frame of the belt conveyor the axis of the shaft is substantially transverse to the direction of movement of the conveyor belt.

4. A conveyor belt cleaning apparatus as defined in claim 1 wherein the mountings of the first and second arms each include a resilient element configured to urge the scraping blade into operative scraping engagement with the conveyor belt surface.

5. A conveyor belt cleaning apparatus as defined in claim 4 wherein said resilient element comprises a torsion spring.

6. A conveyor belt cleaning apparatus as defined in claim 4 wherein said resilient element is formed from a resiliently deformable material.

7. A conveyor belt cleaning apparatus as defined in claim 4 wherein said mountings are adjustable so as to produce the desired contact pressure between the scraping blade and the conveyor belt surface.

8. A conveyor belt cleaning apparatus as defined in claim 7 wherein the mountings of the first and second arms each include a pair of collars comprising a first collar which is rotatably mounted on the shaft and to which a respective arm is connected and a second collar adapted to be locked in position on the shaft, the torsion spring being interposed between said first and second collars with free ends of the torsion spring engaging with the first and second collars, wherein by rotatably adjusting the relative position of the first and second collars on the shaft it is possible to adjust the spring tension in the torsion spring and the biasing torque imposed on the arms connected to each end of the scraping blade.

9. A conveyor belt cleaning apparatus as defined in claim 1 wherein each mounting assembly further includes a locking collar through which the shaft passes and which is locked in position on the shaft, a mounting block, and a torsion spring interposed between the locking collar and the mounting block, with one free end of the torsion spring being engaged in the locking collar and a second free end being engaged in the mounting block so as to provide a torque on said shaft.

10. A conveyor belt cleaning apparatus as defined in claim 1 wherein said third arm comprises a first link and a second link which are pivotably connected together at a hinge point, said first link connected to the shaft and said second link connected to the scraping blade.

11. A conveyor belt cleaning apparatus as defined in claim 10 wherein said second link is adjustable in length by means of a threaded shaft and nut arrangement.

12. A conveyor belt cleaning apparatus as defined in claim 1 adapted to be positioned on the underside of the conveyor belt so as to clean the carrying surface of the conveyor belt as it returns from its discharge point.

13. A conveyor belt apparatus as defined in claim 1 wherein said scraping blade is of a curved type.

* * * * *